United States Patent
Bouchard

(10) Patent No.: US 7,226,058 B2
(45) Date of Patent: Jun. 5, 2007

(54) SLED FOR TRANSPORTING A POWER AUGER VERTICALLY ACROSS ICE

(76) Inventor: Craig Bouchard, 104 Webster St., Haverhill, MA (US) 01830

( * ) Notice: Subject to any disclaimer, the term of this patent is extended or adjusted under 35 U.S.C. 154(b) by 117 days.

(21) Appl. No.: 10/905,722

(22) Filed: Jan. 18, 2005

(65) Prior Publication Data

US 2005/0173874 A1 Aug. 11, 2005

Related U.S. Application Data

(60) Provisional application No. 60/521,023, filed on Feb. 6, 2004.

(51) Int. Cl.
*B62B 15/00* (2006.01)
(52) U.S. Cl. .................................. 280/15; 280/7.12
(58) Field of Classification Search .............. 280/14.1, 280/23.1, 28.12, 28.13, 28.16, 28.17, 15, 280/7.12; 172/387, 392, 395, 424; 175/18
See application file for complete search history.

(56) References Cited

U.S. PATENT DOCUMENTS

| | | | |
|---|---|---|---|
| 1,360,193 A | 11/1920 | Davidson | |
| 2,950,924 A * | 8/1960 | Gantz | 280/14 |
| 2,983,520 A * | 5/1961 | Klages | 280/47.19 |
| 3,004,768 A * | 10/1961 | Klages | 280/47.24 |
| 3,045,851 A * | 7/1962 | Rupert | 414/621 |
| 3,976,147 A | 8/1976 | Cunningham | 173/22 |
| 4,387,483 A | 6/1983 | Larrabee | 16/114 R |
| 4,750,711 A | 6/1988 | Landry | 254/30 |
| 4,961,471 A | 10/1990 | Ovens | 175/170 |
| 4,979,578 A | 12/1990 | Landry | 175/162 |
| 5,123,803 A * | 6/1992 | Crabtree | 414/621 |
| 5,575,490 A | 11/1996 | Simpson, Jr. | 280/28.12 |
| 5,653,456 A * | 8/1997 | Mough | 280/19.1 |
| 5,678,801 A | 10/1997 | Billingsley | 248/676 |
| 5,836,402 A | 11/1998 | Jones | 173/185 |
| 5,873,582 A * | 2/1999 | Kauffman et al. | 280/7.12 |
| 5,918,890 A | 7/1999 | Willems | 280/24 |
| 6,125,951 A | 10/2000 | Bowser | 175/203 |
| 6,474,930 B1 * | 11/2002 | Simpson | 414/490 |
| 6,773,222 B1 * | 8/2004 | Gilchrist | 414/427 |
| 6,981,705 B1 * | 1/2006 | Jolley | 280/7.12 |

OTHER PUBLICATIONS

Dover Rent-All, "Equipment Rental Catalog," Web site http://www.doverrentall.com/draequip/posthole.htm, Sep. 18, 2003, Dover, Delaware.
Crossled North America Ltd., "Ice Anglers—Equipment to Help Carry Tackle . . . " Web site http://www.crossled.net/ice_anglers.html, Jan. 14, 2004, Unionville, ON, Canada.

* cited by examiner

*Primary Examiner*—Christopher Bottorff
(74) *Attorney, Agent, or Firm*—Phillip E. Decker; Mesmer & Deleault, PLLC

(57) ABSTRACT

A sled for transporting a power auger across ice in a vertical position having a cradle for holding the ice auger in a vertical position attached to a center stand with adjustable height. The center stand is attached to a folding stand that is attached to two skis. Each component can be assembled using knobs, and laid flat to be sold as a kit and stored using minimum space in an automobile.

2 Claims, 3 Drawing Sheets

SLED FOR TRANSPORTING A POWER AUGER VERTICALLY ACROSS ICE

BACKGROUND

1. Field of the Invention

This invention relates to apparatuses for transporting power ice augers across ice in connection with the sport of ice fishing.

2. Description of the Related Art

The popular sport of ice fishing requires a robust method and apparatus for drilling holes in ice. The holes are necessary, of course, for dropping through lures and hooks, and for withdrawing the fish. Drilling holes through ice with an auger is very hard work. The present practice is to carry a gas-powered ice auger along with one's fishing gear, chair, and such, from a car parked near the shore, across the ice to the place where one wants to fish. It is axiomatic that the more holes one can drill, the more lines one can have in the water, and the more fish an angler can catch. The limiting factor in ice fishing success has been how many holes one can drill before becoming too tired to drill anymore. Powered ice augers are heavy, and difficult to drag around. Typically, anglers can drill only two or three holes before giving up.

One solution was disclosed in U.S. Pat. No. 5,918,890, which is not admitted to being prior art by its mention in this Background section. The '890 patent discloses a transportable fish house adapted to be towed by a snowmobile. An ice auger can be stored horizontally at the bottom of the sled, and hauled out when needed. This apparatus still requires the angler to transport the whole sled behind a snowmobile and lift the auger into the vertical position when needed. It essentially adds a snowmobile to the list of equipment required for ice fishing.

Another solution is disclosed in U.S. Pat. No. 5,836,402, which is not admitted to being prior art by its mention in this Background section. The '402 patent discloses an auger holder that is transported in the vertical position, but requires the device to be mounted on the back of an ATV or other vehicle. Like the '890 patent, the '402 patent requires the use of another vehicle to transport ice fishing equipment.

Yet another solution is disclosed in U.S. Pat. No. 5,575,490, which is not admitted to being prior art by its mention in this Background section. The '490 patent discloses an ice fishing sled adapted to carry an auger and other ice fishing gear. Although this apparatus does not require a snowmobile, the auger is still transported manually in the horizontal position. It must be lugged up into the vertical position every time it is used.

Finally, the CrosSled device made by CrosSled North America Ltd., of Ontario, Canada, mentions in its advertising that one can strap a hand auger across the uprights of the sled for use in ice angling. The CrosSled resembles a dog sled, but is smaller so that a person can push it. The advertising does not mention use with a power auger, and it apparently cannot mount a power auger in the vertical position.

There are many problems with transporting a power auger in the horizontal position. Laying the auger engine sideways can flood the carburetor, spill gasoline, and foul the spark plug. The engine cannot be started or kept running when horizontal, and the fuel container cannot be filled. Therefore, the engine must be started and stopped for each hole that the angler wants to drill. It is well-known to those having skill in the art that it is difficult to start a small engine in cold weather, and it would be advantageous to have a method and apparatus that permits the engine to continue running until all the desired holes have been drilled. What is needed, therefore, is a sled capable of manually transporting a power ice auger across ice in the vertical position that does not require the use of an auxiliary vehicle.

SUMMARY

The invention is a sled for transporting a power auger across ice in the vertical position that does not require the use of an auxiliary vehicle. The invention comprises a cradle for holding the ice auger in the vertical position attached to a center stand with adjustable height. The center stand is attached to a frame that is attached to two skis. Each component can be assembled using knobs, and laid flat to be sold as a kit and stored using minimum space in an automobile. These and other features and embodiments of the invention will be made clear in the following drawings and description.

DRAWINGS

DESCRIPTION

Figure 1:
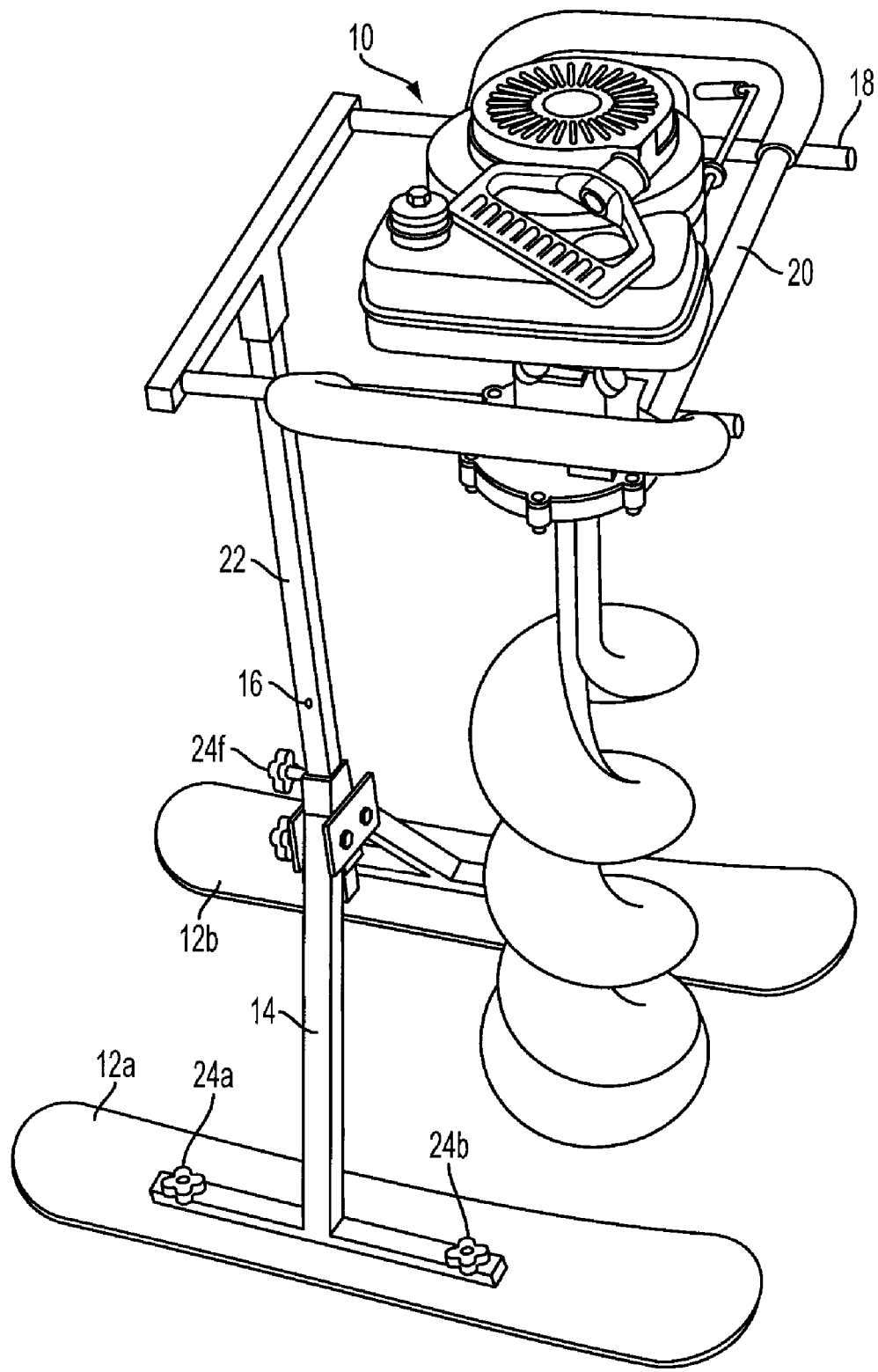
FIG. 1 is a perspective view of the sled invention with the power auger mounted vertically.

The invention is a sled for transporting a power auger across ice in the vertical position that does not require an auxiliary vehicle. FIG. 1 shows a gas powered ice auger 20 mounted vertically on the sled 10 of the present invention, although the invention can also be used with a manual ice auger. The auger 20 rests on a cradle 18 that has arms approximately 36 to 41 cm (14 to 16 inches) across and about 33 to 36 cm (13 to 14 inches) long to engage the handles of the ice auger 20. The end of the arms can be bent upward slightly at their distal ends to prevent the auger 20 from sliding off the cradle 18, yet not inhibit mounting the auger onto the sled from the rear. The distal end of the arms can also be straight. The arms have a proximal end where they are secured to a cross bar. The cross bar removably mounts to the sled 10 with a base that is about three inches long, as shown, or it can be directly mounted to a center post 22 by fitting an attachment on the cross bar over the center post.

Figure 2:
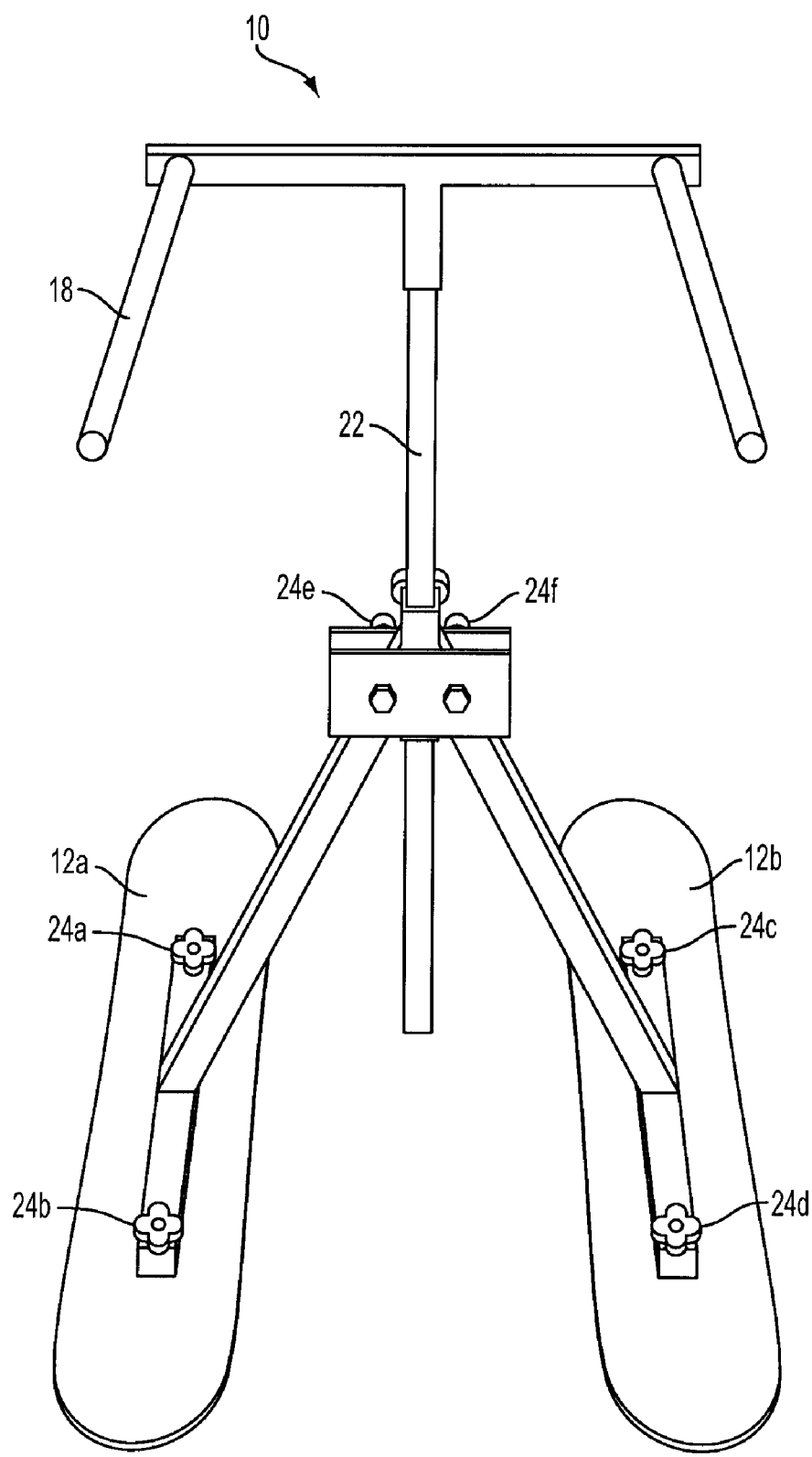
FIG. 2 is a rear perspective view of the sled of the present invention.

As shown in both FIGS. 1 and 2, the base portion of the cradle 18 can be removably secured to a center post 22 with screws that are secured with two knobs 24g, 24h. Alternatively, the cradle 18 can be attached directly to the center post 22 without screws. For example, a fitting on the cradle could fit over the center post. The center post 22 is preferably about 91 cm (36 inches) in length, and is removably secured to a stand 14. The height of the center post 22 can be adjusted by loosening a securing means like a knob 24f.

The stand 14, if provided as a folding stand, can be locked open by engaging another knob 24e. Alternatively, the stand can be supplied as a non-folding unit. The stand has a center post receiving portion adapted to be secured to the center post. The receiving portion can be provided with a means for removably securing it to the center post, or a means for adjusting the height of the center post. The stand also has two legs having distal ends and proximal ends, the proximal ends adapted to be secured to the post receiving portion. The leg distal ends are preferably, but not necessarily, secured substantially perpendicularly to corresponding feet.

The feet are attached to a pair of ski means 12a, 12b by screws operated by a series of knobs 24a, 24b, 24c, and 24d. The length of the ski means 12a, 12b, and the length of the base portion of the stand 14 are chosen to make the sled 10 stable when transporting the power auger 20. The ski means 12a, 12b can be snow skis, water skis, snowboards, purpose-built skis, or other structures that are capable of sliding across ice and snow.

Figure 3:
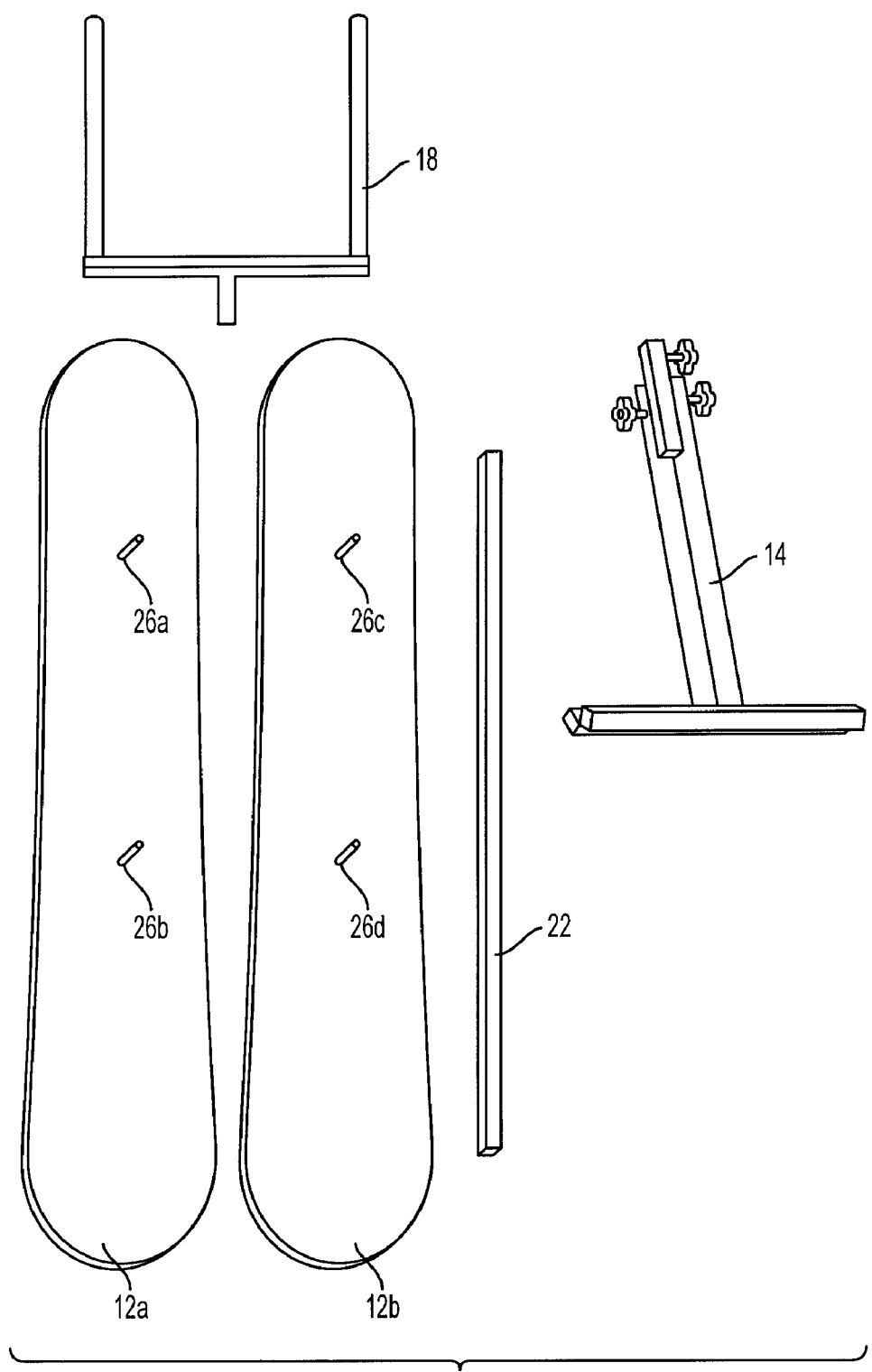
FIG. 3 shows the invention disassembled to be stored or sold as a kit.

FIG. 3 shows the sled 10 disassembled and laid flat for storage or for sale as a kit. The stand 14 is folded, and the cradle 18, ski means 12a, 12b, and center post 22 have been taken apart. The knobs 24 are not shown, but this view shows the position of four bolts 26a, 26b, 26c, 26d attached to the ski means 12a, 12b.

The ability to disassemble the sled 10 and lay the components flat is an advantage of this invention over the prior art. In use, the parts would be stored in a bag or case that fits inside the trunk of an ordinary automobile. The angler would take the parts out of the bag and assemble them together using the securing means, such as knobs 24, supplied. Knobs 24 are important because they can be operated while wearing heavy gloves or mittens. Once assembled, the angler takes out the powered ice auger 20 from the automobile and sets it on the cradle 18. At this point, the auger 20 is at the proper height for unscrewing the gas cap and filling the fuel tank. The pull starter and throttle are at chest height, making it very easy to start. The angler pushes or pulls the auger 20 and sled 10 to the location on a frozen lake where the first hole will be drilled. The auger 20 can be started on the stand and lifted off to start drilling.

One option is to make the center post 22 or stand 14 spring-loaded so that the auger 20 does not have to be removed from the sled 10 to drill holes. The angler merely pushes down on the auger 20 handles and drills a hole under the sled 10.

After drilling the hole, the auger 20 is placed back on the sled, where it can continue running. The user can then push the sled to the location where the next hole is to be drilled. For safety reasons, the user may want to turn the engine off between holes. However, the angler does not have to lay the auger 20 down to the horizontal position, so there is little chance the carburetor would become flooded, the spark plug fouled, or fuel spilled. This system makes it so easy to transport the power auger 20 onto a lake that a single angler can make a large number of holes without becoming fatigued. The angler will be more successful at fishing because there are more holes from which to fish.

The sled 20 can be provided as a kit. The cradle 18, stand 14, ski means 12a, 12b, and center post 22 could be made by different manufacturers who would ship the parts to a kit vendor. The parts can be collected into a bag with instructions, and boxed for sale and shipment. This system saves space, shipping costs, and therefore money. The result is that the sled 10 is very affordable to anglers of average financial means.

The cradle 18, stand 14, and center post 22 are preferably made of steel square tubing that has been coated to prevent corrosion. Many types of coating are available, including power coating, rubber coating, anodizing, and plating. The sled 10 is preferably designed to weigh less than 9 kg (20 pounds).

Although knobs are described as the means for removably securing the components together, other means for removably securing components that are known in the art can be substituted. Examples include, but are not limited to, bolts, screws, hex nuts, wing nuts, acorn nuts, clearance fits, sliding fits, press fits, interference fits, cotter pins, and clevis pins.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A sled for transporting an ice auger across ice in a vertical position and does not require an auxiliary vehicle comprising:
   a cradle adapted to hold an ice auger in a vertical position, removably secured to
   a center post secured to
   a stand comprising:
      a center post receiving portion adapted to secure to the center post;
      two stand legs having distal ends and proximal ends, the proximal ends adapted to be secured to the center post receiving portion; and
      a removable securing means for removably securing the legs to the center post receiving portion.

2. The sled of claim 1, wherein said removable securing means are at least one taken from the group consisting of knobs, bolts, screws, hex nuts, wing nuts, acorn nuts, clearance fits, sliding fits, press fits, interference fits, cotter pins, and clevis pins.

* * * * *